United States Patent [19]

Anflo et al.

[11] Patent Number: 4,682,178
[45] Date of Patent: Jul. 21, 1987

[54] HF ARRANGEMENT

[75] Inventors: Kjell S. Anflo, Hägersten; Jan W. I. Grabs, Bålsta, both of Sweden

[73] Assignee: U.S. Philips Corporation, New York, N.Y.

[21] Appl. No.: 690,926

[22] Filed: Jan. 11, 1985

[30] Foreign Application Priority Data

Jan. 12, 1984 [SE] Sweden .................................. 8400140

[51] Int. Cl.[4] .......................... G01S 7/28; H03B 9/10; H03L 7/24
[52] U.S. Cl. ....................................... 342/202; 331/2; 331/5; 331/172
[58] Field of Search ................ 343/5 SW, 7.7, 17.1 R; 331/2, 5, 172, 173; 342/202, 160, 134

[56] References Cited

U.S. PATENT DOCUMENTS

| | | | |
|---|---|---|---|
| 2,586,028 | 2/1952 | Grayson et al. | 343/7.7 |
| 2,901,707 | 8/1959 | Kline et al. | 331/173 |
| 2,977,589 | 3/1961 | Gutton | 343/17.1 R |
| 3,020,539 | 2/1962 | Gruenberg | 343/7.7 |
| 4,072,944 | 2/1978 | Bianco et al. | 343/7.7 X |
| 4,079,378 | 3/1978 | Hulderman | 343/17.1 R |

FOREIGN PATENT DOCUMENTS 1014810  12/1965  United Kingdom .

OTHER PUBLICATIONS

Jordan, *Comparison of Two Major Classes of Coherent Pulsed Radar Systems*, IEEE Trans on Aerospace and Electronic Systems, vol. AES-11, No. 3, May 1975, pp. 363–371.

Radar Techniques, Sweden, 1978, p. 8–11, FIGS. 8, 9.

Primary Examiner—T. H. Tubbesing
Assistant Examiner—Gilberto Barrón, Jr.
Attorney, Agent, or Firm—Robert J. Kraus

[57] ABSTRACT

The invention relates to a coherent radar comprising a magnetron (10), a modulator (12) for pulsed driving if the magnetron, a stable local oscillator (22) and mixer (20) for producing an intermedicate frequency signal of incoming echoes and an intermediate frequency oscillator (28) and phase sensitive detector (26) for detecting the echo pulses in order to generate a so called bipolar video signal. According to the invention a HF-signal derived from the stable oscillator (22) is fed to the tuning cavities of the magnetron (10), so called priming, at least in the transmission moment, and furthermore the modulator (12) and the intermediate frequency oscillator (28) are mutually time controlled in such manner that the leading edge of the modulator pulse and thereby of the magnetron pulse always appears in a given phase position of the output signal from the intermediate frequency oscillator, for example a zero passage.

5 Claims, 13 Drawing Figures

HF ARRANGEMENT

BACKGROUND OF THE INVENTION

The invention relates to a coherent radar comprising a transmitting tube, in particular a magnetron, a modulator for driving the magnetron in order to generate and transmit HF-pulses, and a stable local oscillator (STALO) for generating an intermediate frequency signal by mixing its output signal with echo pulses caused by the transmitted pulses. The intermediate frequency signal has a frequency corresponding to the difference between the stable local oscillator frequency and the frequency of the transmitted pulses. An oscillator operating at the intermediate frequency applies an output signal to a phase sensitive detector together with the intermediate frequency signal obtained by the mixing, in order to detect the echo pulses and to generate a signal, called bipolar video, i.a. representing the relative phase position of the HF-signals in the received and the transmitted pulses. After filtering the bipolar video signal can be used, both within an unambiguous distance and at ambiguous distances, to separate targets with different radial speeds relative to the radar station, e.g. with the aim to suppress echoes from fixed objects and only indicate moving targets.

A known type of coherent radar using a magnetron as a HF-source comprises a memory for the phase of each transmitted pulse, because the phase of the magnetron has no interrelationship between successive pulses. This memory function is realized by applying a portion of the output signal of the magnetron to a mixer, where it is mixed with the output signal from the stable local oscillator. At the output of the mixer a pulse of intermediate frequency is obtained, a so-called phase locking pulse, which is led to the intermediate frequency oscillator, often called coherent oscillator (COHO), for locking the phase of the same during the transmitter pulse. The intermediate frequency oscillator then has such a stability that its phase is maintained during the listening time interval and therefore the oscillator serves as a memory for the phase of the transmitted pulse. It is apparent from the above that this memory is reset for each transmitted pulse and therefore it is not useable for incoming echoes resulting from previous transmitter pulses, so called ambiguous echoes. A receiver coherent radar of this type therefore cannot separate echoes beyond the unambiguous distance, so called second time echoes, third time echoes, etc., e.g. for suppression of strong echoes coming from large distances.

Separation of ambiguous echoes by speed filtering can be obtained if the phase and frequency of the transmitter is made adjustable. This can be realized if the output signal from the intermediate frequency oscillator, which now is made to operate continuously, is led to a mixer where it is mixed with the output signal of the stable local oscillator, which also operates continuously. The mixing product is led to a transmitter tube, where it is amplified and transmitted in pulsed shape. Thus, in this case there is continuity as regards the phase of the transmitted pulses from pulse to pulse.

As a magnetron cannot be brought to establish the same frequency and a fixed phase relationship to the mixing product of the signal from the intermediate frequency oscillator and the signal from the stable local oscillator it cannot be used in the above described type of radar.

SUMMARY OF THE INVENTION

The object of the invention is to provide a coherent radar using a magnetron as a transmitter tube and having the ability to achieve radial speed separation both at unambiguous distances and at ambiguous distances.

According to the invention a signal derived from the stable local oscillator in the transmission moment is fed to the tuning cavities of the magnetron and that the modulator, and intermediate frequency oscillator are mutually time controlled in such manner that the leading edge of the modulator pulse, and thereby of the magnetron pulse, always appears in a predetermined phase position of the output signal of the intermediate frequency oscillator. Suitably the modulator can be controlled by a zero passage in the intermediate frequency oscillator at certain intervals depending on the required pulse repetition frequency.

The invention is based upon the fact that the phase position of the HF-pulse from the magnetron relative to the phase position of the stable local oscillator can be controlled in the starting moment of the magnetron by applying a portion of the output signal of the stable oscillator to the magnetron, so called priming. By mixing the HF-pulse from the magnetron with the signal from the stable oscillator an intermediate frequency will be obtained, the phase position of which relative to the starting moment of the magnetron will be the same from pulse to pulse. As the magnetron according to the invention is started in a certain phase position of the signal from the continuously operating intermediate frequency oscillator then the relative phase position of the signal from the intermediate frequency oscillator and the intermediate frequency signal resulting from echoes will be constant from pulse to pulse if the phase position of the echo signal relative to the transmitted pulse is constant. The bipolar video will contain desired phase information and can e.g. be filtered for obtaining velocity separation at ambiguous distances.

It is essential that the frequency of the signal, which is fed to the magnetron differs from the transmission frequency of the magnetron. The difference in frequency can in one embodiment be equal to the selected intermediate frequency. The signal fed to the magnetron and the signal fed to the mixer as local oscillator frequency then suitably can be derived from one and the same stable oscillator.

It is observed that it has previously been proposed to feed HF-energy from an oscillator to the tuning cavities of a pulse controlled magnetron, so called priming. It is known that this enables starting of the HF-oscillation in a controlled manner and that it results in less frequency and time jitter and better spectrum purity. To utilize this priming technique in order to achieve a coherent magnetron radar with the ability of velocity separation at ambiguity distances is, however, not previously known.

BRIEF DESCRIPTION OF THE DRAWING

The invention is illustrated by means of example with reference to the accompagning drawing, in which.

DESCRIPTION OF THE PREFERRED EMBODIMENT

Figure 1:
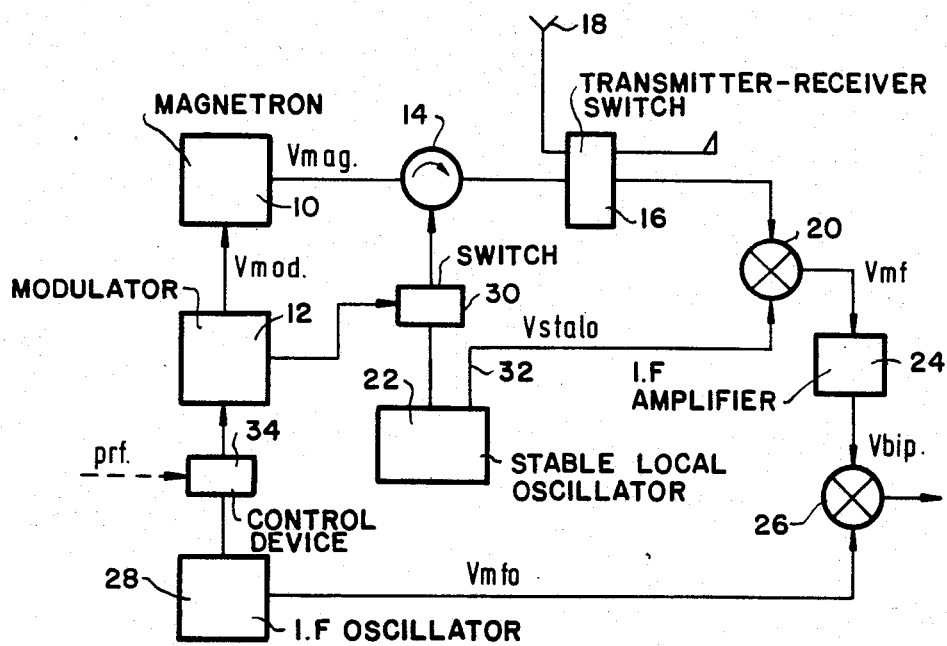
FIG. 1 shows a block diagram for a radar with a magnetron as a HF-source according to the invention.

According to FIG. 1 a magnetron 10 is driven with short voltage pulses Vmod from a modulator 12 and the generated HF-pulses Vmag are led via a circulator 14 and a transmitter-receiver switch 16 to an antenna 18 which radiates the pulses. Echo pulses coming from a reflecting object and caused by the transmitted radar pulses are received by the same antenna and are led via the transmitter-receiver switch to a mixer 20, in which they are combined with the output signal Vstalo from a stable local oscillator 22. The magnetron is so tuned that the transmitted frequency differs from the frequency of the stable oscillator and the mixer delivers echo pulses Vmf on an intermediate frequency, which is equal to the difference between the transmitted frequency and the frequency of the stable oscillator. The intermediate frequency signal Vmf is amplified in an intermediate frequency amplifier 24 and is then led to a phase sensitive detector 26, which also receives the output signal Vmfo from a continuously operating oscillator 28. This operates on a frequency which is equal to the selected intermediate frequency and the phase detector delivers a signal Vbip, which is called bipolar video because it can assume both a positive and a negative value. The bipolar video represents, not only the strength of the echo signal, but also the mutual phase of transmitted and received HF-signals. If the distance between the radar equipment and the reflecting object varies with time the bipolar video signal Vbip will vary with a frequency which depends on the distance variation with time, i.e. the signal runs through a 360 degrees sequence for each half wave length that the distance to the reflector is varied. The bipolar video is thereafter imparted a filtering operation, e.g. in a MTI-filter which in principle is a highpass filter for suppression of echoes from fixed objects, or velocity separation at an ambiguity distance.

In order to ensure that the bipolar video signal Vbip is representative of the mutual phase ratio between transmitted and received signal energy, the following steps according to the invention are taken:

First a portion of the output signal of the stable oscillator 22 is led via a switch 30 and the circulator 14, immediately before and during the transmitted pulse, to the tuning cavities of the magnetron, so called priming. A directional coupler 32 is arranged to distribute the energy from the stable oscillator between the mixer 20 and the magnetron 10. The switch 30 is controlled from the modulator 12 in such manner that it is normally open. It is closed immediately before the start of the magnetron and is then maintained closed during the magnetron pulse. Each time the magnetron is started and its own oscillation is built up a small quantity of oscillating energy of the frequency and phase of the stable oscillator is present in the cavities of the magnetron. This will improve the starting properties but it also influences the initial phase and thereby the phase position of the whole HF-pulse.

Second the modulator 12 is time controlled from the intermediate frequency oscillator 28 via a control device 34 in such manner that the leading edge of the modulator pulse always coincides with a given phase position of the output signal of the intermediate frequency oscillator 28, e.g. a zero passage in a given sense.

In one example with internal generation of the pulse repetition frequency 34 the control device PRF can consist of a counter, which is adapted to count the number of positive or negative zero passages in the output signal of the intermediate frequency oscillator and causes each $n^{th}$ zero passage to start the modulator. Alternatively the pulse repetition frequency prf can be generated externally. In this case the control device 34 can comprise an AND-gate receiving at one input the signal prf from the external prf-generator, see the dashed line in FIG. 1, and at a second input receives pulses representing zero passages in the output signal of the intermediate frequency oscillator. The modulator and thereby the magnetron then will be started at the first zero passage in the given direction after reception of a prf-signal from the external generator.

Figure 2:
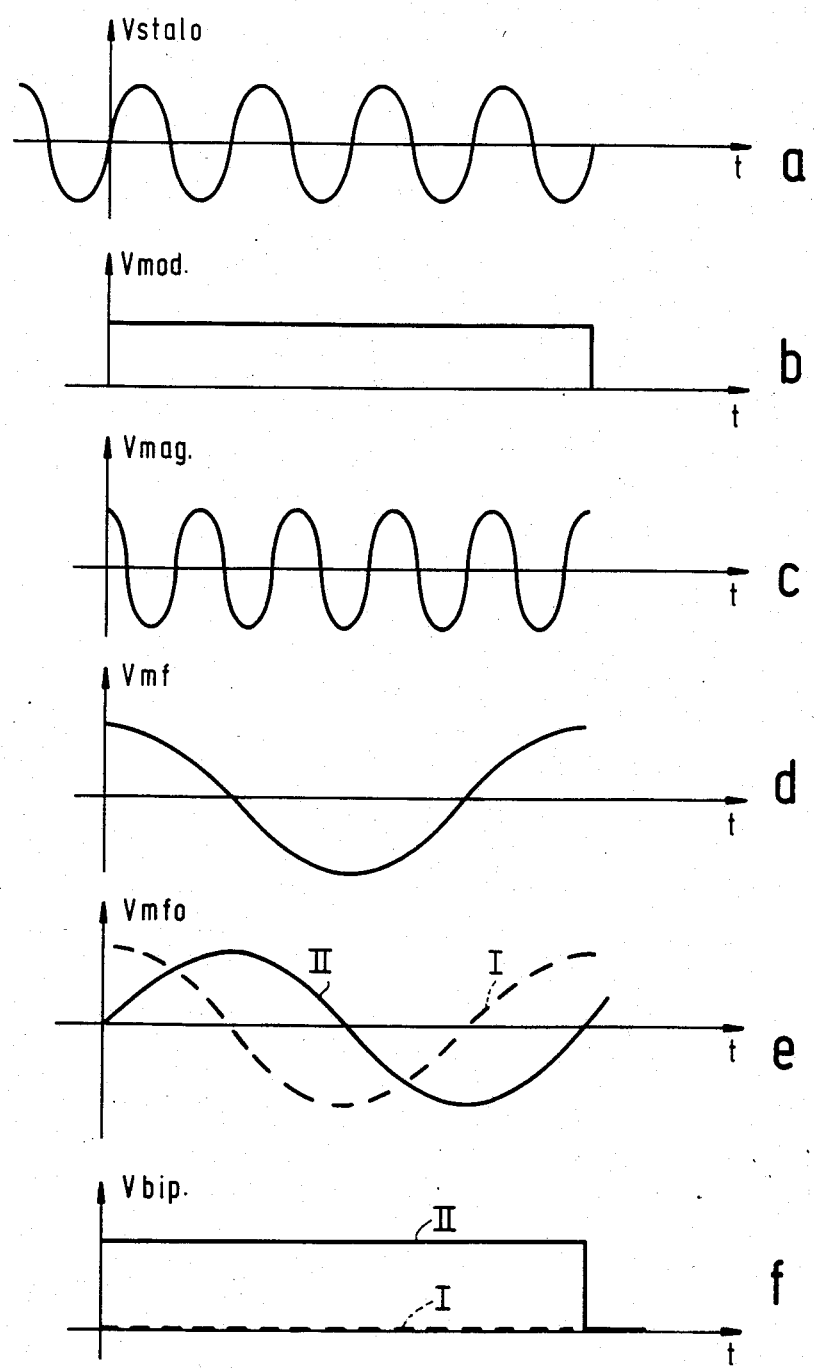
FIGS. 2 and 3 show time diagrams in order to explain the invention.
Figure 3:
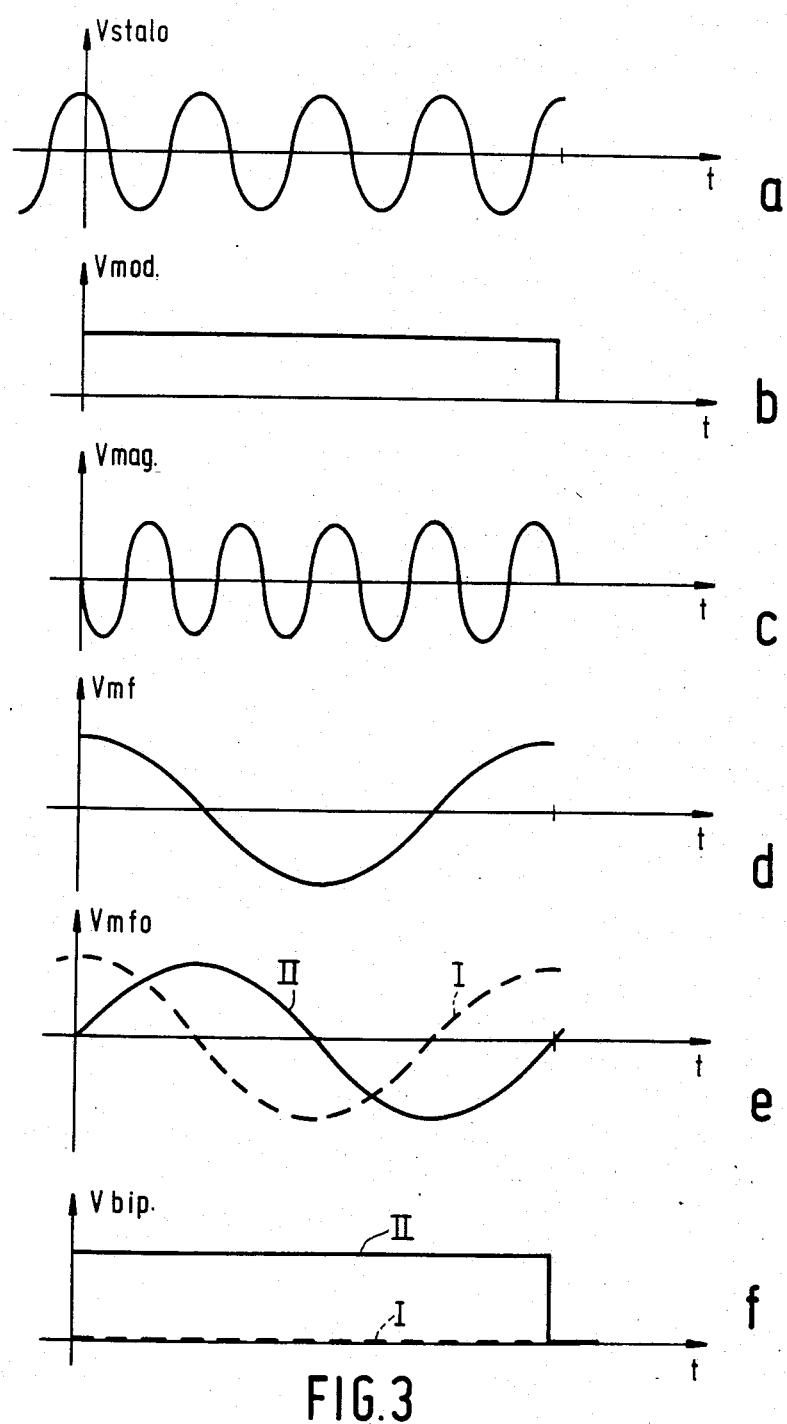

The cause to this time control of modulator is explained with reference to the FIGS. 2 and 3, which show the same time diagrams but with different mutual phase position between the signal from the stable oscillator and the modulator pulse.

The diagram (a) in both figures shows the output signal Vstalo from the stable oscillator 22 as a function of time t, and the diagram (b) shows the modulator pulse Vmod. As an example, FIG. 2 shows a modulator pulse, the leading edge of which coincides with a positive zero passage in the Vstalo, i.e. a phase position which can be designated as zero, while in FIG. 3 the leading edge of the modulator pulse coincides with a positive maximum in Vstalo, i.e. in a phase position of 90°. The diagrams (2c) and (3c) show the output voltage of the magnetron as function of time in the two cases, the diagrams showing an ideal waveform without the start phenomena which can occur in reality. It is evident that the magnetron according to the diagram (2c) starts at a positive maximum, i.e. 90° before the voltage from the stable oscillator 22. According to the diagram (3c) the magnetron in this case starts at a negative zero passage, i.e. with the phase position 180°, which is also 90° before the corresponding voltage Vstalo. Generally it can be said that the magnetron always will oscillate in a phase position which has a predetermined relationship to the phase of the applied priming voltage, i.e. the voltage Vstalo. This in turn involves that the intermediate frequency signal resulting from echo pulses reflected from objects on a given constant distance will have a constant phase position.

This is illustrated in the diagrams (2d) and (3d) showing the intermediate frequency signal which is obtained if the voltage from the stable oscillator Vstalo is combined directly with the HF-signal generated by the magnetron Vmag. The last signal can be regarded as a reflected signal from an object at the distance zero. It is evident that the intermediate frequency signal in these two cases will have the same shape and phase in spite of the different starting conditions.

The diagrams (2e) and (3e) show the output voltage Vmfo from the intermediate frequency oscillator in two different phase positions relative to the modulator pulse and the diagrams (2f) and (3f) show the bipolar video signal Vbip obtained if the intermediate frequency signal Vmf according to figure to (2d) or (3d) is detected with use of the one or the other oscillator voltage as reference. In a first example, shown by dashed curve I, the oscillator voltage Vmfo is in phase with Vmf. This will according to figure (2f) and (3f), after detection in the phase sensitive detector 26, result in a bipolar video signal which has the value zero (the same phase position of the compared signals). In a second example the voltage Vmfo according to the curve II drawn with full line is 90° after Vmf. This results according to the diagrams (2f) and (3f) in a positive maximum value of the bipolar video signal. One and the same intermediate frequency signal thus will produce different bipolar video signals dependent upon the phase position of the output voltage of the intermediate frequency oscillator Vmfo relative to the modulator pulse. If the bipolar video signal shall be a measure on the mutual phase position between transmitted and received HF-signal and thus the distance to the reflecting object, the output voltage of the intermediate frequency oscillator Vmfo must have a predetermined phase relative to the modulator pulse.

By the time control of the modulator in combination with the priming control of the magnetron according to the invention phase coherence between the mixing product of the signals from the magnetron and the stable local oscillator and the output signal of the intermediate frequency oscillator is obtained. This involves that the phase position of the echo pulses can be related to the phase position of the intermediate frequency oscillator and the bipolar video will i.a. contain information about the relative phase position of the HF-signals in the transmitted pulse and the echo pulse.

The invention can be combined with receiver coherent radar of the kind as described in the beginning of the specification. Hereby it is achieved that separation of echoes within and beyond an unambiguity distance will be determined by different factors. More specifically the possibilities of separation at the ambiguity distance is a result of the steps according to the invention, while the separation within the unambiguity distance is a result of the receiver coherent properties of the radar.

In the described embodiment the output signal of the local oscillator is used directly as the priming control signal and the difference between the frequency of this priming control signal and the transmission frequency of the magnetron is equal to the selected intermediate frequency. However, a priming frequency other than the frequency of the stable oscillator can also be used; the only important thing is that the priming frequency differs from the transmitted frequency of the magnetron. As an example the frequency of the local oscillator can be transposed to the desired priming frequency by means of a mixer under the condition that the phase position of the second signal fed to the mixer is the same at the starting moment of the magnetron for each transmission moment.

A number of other modifications are also possible within the scope of the invention. Thus, the modulator and thereby the magnetron can be started at each arbitrary phase position of the output signal of the intermediate frequency oscillator. In case of constant pulse repetition frequency it is, in principle, also possible to phase control the intermediates frequency oscillator from the modulator instead of the reverse.

What is claimed is:

1. A coherent radar comprising a transmitting tube, in particular a magnetron, a modulator for driving the magnetron in order to generate and transmit HF-pulses, a stable local oscillator for producing an intermediate frequency signal by mixing its output signal with echo pulses caused by the transmitted pulses, which intermediate frequency signal has a frequency which corresponds to the difference between the stable local oscillator frequency and the frequency of the transmitted pulses, and an oscillator operating at an intermediate frequency the output signal of which is led to a phase sensitive detector together with the intermediate frequency signal obtained by the mixing in order to detect the echo pulse and to generate a signal containing information about the mutual phase position between transmitted and received HF-signals, characterized in that a signal derived from the stable local oscillator is fed to the tuning cavities of the magnetron, at least in the moment of transmission, and that the modulator and the intermediate frequency oscillator are mutually time controlled in such manner that the leading edge of the modulator pulse and thereby the magnetron pulse always appears at a predetermined phase position of the output signal of the intermediate frequency oscillator.

2. A coherent radar as claimed in the claim 1, characterized in that the frequency of the signal fed to the tuning cavities of the magnetron differs from the transmission frequency of the magnetron by an amount, which is equal to the intermediate frequency.

3. A coherent radar as claimed in the claim 1 or 2, characterized in that the modulator is time controlled from the intermediate frequency oscillator.

4. A coherent radar as claimed in the claim 3, characterized in that the modulator is controlled by a zero passage in the output signal of the intermediate frequency oscillator.

5. A coherent radar as claimed in claim 1 or 2, characterized in that the HF-signal utilized as local oscillator voltage and the signal fed to the tuning cavities of the magnetron are derived from one and the same stable oscillator.

* * * * *